(12) United States Patent
Veerasamy

(10) Patent No.: US 7,033,649 B2
(45) Date of Patent: *Apr. 25, 2006

(54) HYDROPHILIC DLC ON SUBSTRATE WITH UV EXPOSURE

(75) Inventor: Vijayen S. Veerasamy, Farmington Hills, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/870,939

(22) Filed: Jun. 21, 2004

(65) Prior Publication Data

US 2004/0224161 A1 Nov. 11, 2004

Related U.S. Application Data

(60) Continuation of application No. 10/675,975, filed on Oct. 2, 2003, now Pat. No. 6,793,979, which is a division of application No. 09/987,692, filed on Nov. 15, 2001, now Pat. No. 6,713,179, which is a continuation-in-part of application No. 09/899,176, filed on Jul. 6, 2001, now Pat. No. 6,592,992, which is a division of application No. 09/577,337, filed on May 24, 2000, now Pat. No. 6,303,225.

(51) Int. Cl.
*B05D 3/00* (2006.01)

(52) U.S. Cl. ............... 427/553; 427/249.1; 427/249.7; 427/577

(58) Field of Classification Search ............ 427/249.1, 427/249.7, 553, 577
See application file for complete search history.

(56) References Cited

U.S. PATENT DOCUMENTS 4,210,431 A 7/1980 Bachman et al.
4,504,519 A 3/1985 Zelez
RE32,272 E 10/1986 Funaki et al.
4,728,529 A 3/1988 Etzkorn et al.
4,816,291 A 3/1989 Desphandey et al.
5,346,729 A 9/1994 Pitts et al.
5,378,527 A 1/1995 Nakanishi et al.
5,425,983 A 6/1995 Propst et al.
5,470,661 A 11/1995 Bailey et al.
5,508,092 A 4/1996 Kimock et al.
5,508,368 A 4/1996 Knapp et al.

(Continued)

FOREIGN PATENT DOCUMENTS

EP 0 499 287 A1 8/1992

(Continued)

OTHER PUBLICATIONS

U.S. Appl. No. 10/675,975, filed Oct. 2, 2003.

(Continued)

*Primary Examiner*—Archene Turner
(74) *Attorney, Agent, or Firm*—Nixon & Vanderhye P.C.

(57) ABSTRACT

A substrate is coated with a layer(s) or coating(s) that includes, for example, amorphous carbon in a form of diamond-like carbon (DLC). In certain embodiments, the DLC inclusive layer may be doped with at least one polar inducing dopant (e.g., Boron, Nitrogen, and/or any other suitable polar inducing dopant) in order to make the layer more polar and thus more hydrophilic so as to have a lower contact angle θ. In other embodiments, where such doping is optional, the DLC may be exposed to ultraviolet (UV) radiation in a manner sufficient to cause the contact angle θ of the DLC layer to drop into a hydrophilic range (e.g., less than or equal to about 20 degrees).

11 Claims, 5 Drawing Sheets

U.S. PATENT DOCUMENTS

| | | | |
|---|---|---|---|
| 5,637,353 | A | 6/1997 | Kimock et al. |
| 5,653,812 | A | 8/1997 | Petrmichl et al. |
| 5,665,424 | A | 9/1997 | Sherman |
| 5,718,976 | A | 2/1998 | Dorfman et al. |
| 5,770,321 | A | 6/1998 | Hartig et al. |
| 5,800,918 | A | 9/1998 | Chartier et al. |
| 5,846,649 | A | 12/1998 | Knapp et al. |
| 5,849,368 | A | 12/1998 | Hostettler et al. |
| 5,854,708 | A | 12/1998 | Komatsu et al. |
| 5,858,477 | A | 1/1999 | Veerasamy et al. |
| 5,888,593 | A | 3/1999 | Petrmichl et al. |
| 5,900,342 | A | 5/1999 | Visser et al. |
| 6,046,758 | A | 4/2000 | Brown et al. |
| 6,136,386 | A | 10/2000 | Nakahigashi et al. |
| 6,273,488 | B1 | 8/2001 | Pike et al. |
| 6,277,480 | B1 | 8/2001 | Veerasamy et al. |
| 6,280,834 | B1 | 8/2001 | Veerasamy et al. |
| 6,284,377 | B1 | 9/2001 | Veerasamy |
| 6,303,225 | B1 | 10/2001 | Veerasamy |
| 6,303,226 | B1 | 10/2001 | Veerasamy |
| 6,592,992 | B1 | 7/2003 | Veerasamy |
| 6,660,340 | B1 | 12/2003 | Kirkpatrick |
| 6,665,033 | B1 | 12/2003 | Callegari et al. |
| 6,706,363 | B1 | 3/2004 | Honda et al. |
| 6,713,179 | B1 | 3/2004 | Veerasamy |

FOREIGN PATENT DOCUMENTS

| | | |
|---|---|---|
| EP | 0 821 077 | 1/1998 |
| WO | WO 94/12680 | 6/1994 |
| WO | WO 97/16580 | 5/1997 |
| WO | WO 00/56127 | 9/2000 |

OTHER PUBLICATIONS

XP-002247812 INSPEC/IEE "Control of the Hydrogen Content of Diamond-Like Carbon Films Deposited Using Unbalanced Magnetron Sputtering", Seo et al., Dec. 1996.

XP-002247813 INSPEC/IEE "Characterization by UV-Visible and IR Spectroscopy of Thin Diamond-Like Carbon Films Prepared by Laser-Arc", Scheibe et al., Sep. 1993.

International Search Report dated Aug. 4, 2003.

JPCL., May 1992, "The Degradation of Coatings by Ultraviolet Light and Electromagnetic Radiation", Hare.

XP 002041954 "Electronic Density of States in Highly Tetrahedral Amorphous Carbon", Veerasamy et al., pp. 319-325.

XP 002041955 "Preparation and Properties of Highly Tetrahedral Hydrogenated Amorphous Carbon", Weiler et al., Jan. 1996, pp. 1594-1607.

"Optical and Electronic Properties of Amorphous Diamond", Veerasamy et al., Apr. 1993, pp. 782-787.

"Deposition of Carbon Films by a Filtered Cathodic Arc", Kuhn et al., Aug. 1993, pp. 1350-1354.

Gaseous Precursors of Diamond-Like Carbon Films, Riccardi et al., Vacuum 61, pp. 211-215.

"Highly Tetrahedral, Diamond-Like Amorphous Hydrogenated Carbon Prepared from a Plasma Beam Source", Weiler et al., May 1994, pp. 2797-2799.

"Surface Hardening of Ceramic and Glass Materials", IBM Corp., 1993, vol. 36, No. 03, Mar. 1993.

"Properties of Ion Beam Deposited Tetrahedral Fluorinated Amorphous Carbon Films (ta-C), Ronning et al. Mat. Res. Soc. Symp. Proc. vol. 593, pp. 335-340 (2000)".

"Fluorinated Diamond Like Carbon Films Produced by Plasma Immersion Ion Processing Technique, Hakovirta et al., Mat. Res. Soc. Symp. Proc. vol. 593, pp. 285-290 (2000)".

"Ventree Super Hydrophilic Material", 10 pgs.

A Dissertation, "Tetrahedral Amorphous Carbon Deposition, Characterisation and Electronic Properties", Veerasamy, Jul. 1994, pp. 1-295.

HYDROPHILIC DLC ON SUBSTRATE WITH UV EXPOSURE

This application is a continuation of application Ser. No. 10/675,975, filed Oct. 2, 2003, now U.S. Pat. No. 6,793,979, which is a divisional of application Ser. No. 09/987,692, filed Nov. 15, 2001, now U.S. Pat. No. 6,713,179, which is a continuation-in-part (CIP) of U.S. patent application Ser. No. 09/899,176, filed Jul. 6, 2001 (now U.S. Pat. No. 6,592,992), which is a division of U.S. patent application Ser. No. 09/577,337, filed May 24, 2000 (now U.S. Pat. No. 6,303,225), the disclosures of which are hereby incorporated herein by reference.

This invention relates to a hydrophilic coating including diamond-like carbon (DLC) provided on (directly or indirectly) a substrate of glass, plastic, or the like, and a method of making the same. More particularly, this invention relates to a DLC inclusive coating that is exposed to at least ultraviolet (UV) radiation in order to cause the coating to either become hydrophilic or become more hydrophilic (i.e., to cause contact angle $\theta$ of the coating to decrease).

BACKGROUND OF THE INVENTION

It is often desirable to provide a hydrophilic coating (e.g., anti-fog coating) on a substrate such as an automotive windshield, automotive window, automotive mirror, architectural mirror, bathroom mirror, or the like. Such coatings may reduce the likelihood of water drops deposited on the substrate taking globular shape(s), thereby enabling visibility to be improved. In other words, hydrophilic coatings function to reduce bead-like condensation on substrate surfaces (e.g., on the interior surface of an automotive windshield or window). A hydrophilic coating can reduce the formation of many tiny droplets of liquid, which can scatter light, on a surface (i.e., make condensation on a surface film-wise as opposed to droplet-wise).

Unfortunately, certain hydrophilic coatings are not as durable and/or hard as would otherwise be desired and thus are not efficient from a practical point of view for applications such as automotive windshields and/or other types of windows.

In view of the above, it is apparent that there exists a need in the art for (i) a coated article (e.g. coated glass or plastic substrate) having hydrophilic properties, and a method of making the same, and/or (ii) a protective hydrophilic coating for window and/or mirror substrates that is somewhat resistant to scratching, damage, or the like.

It is a purpose of different embodiments of this invention to fulfill any or all of the above described needs in the art, and/or other needs which will become apparent to the skilled artisan once given the following disclosure.

SUMMARY OF THE INVENTION

An object of this invention is to provide a durable coated article that it is less likely to attract or be affected by bead-like liquid condensation. Exemplary applications to which such hydrophilic coating(s) may be applied include, for example without limitation, automotive windshields, automotive backlites (i.e., rear vehicle windows), automotive side windows, architectural windows, mirrors, etc.

Another object of this invention is to provide a scratch resistant hydrophilic coating for use in conjunction with a coated article.

Another object of this invention is to form or provide a hydrophilic coating by doping diamond-like carbon (DLC) with at least one polar inducing dopant(s) such as, for example, boron (B) and/or nitrogen (N). In certain embodiments, the atomic percentage of the polar inducing dopant(s) (e.g., B and/or N dopants, but not including H dopants that may or may not be added because H is not a polar inducing dopant) is no greater than about 10%, more preferably no greater than about 5%, and most preferably no greater than about 4%. A polar inducing dopant is a dopant that causes DLC to become more graphitic (e.g., cause more $sp^2$ bonds), as opposed to more tetrahedral (i.e., more $sp^3$ bonds). Polar inducing dopant(s) tend to cause the DLC inclusive layer to be more polar, which in turn increases surface energy and thus provides for a more hydrophilic coating.

Another object of this invention is to provide a coated article, wherein a layer of the coating includes both $sp^2$ and $sp^3$ carbon-carbon bonds and has a wettability W with regard to water of at least about 700 mN/m, more preferably at least about 750 mN/m, and most preferably at least about 800 mN/m. This can also be explained or measured in Joules per unit area ($mJ/m^2$).

Another object of this invention is to cause contact angle $\theta$ of a DLC inclusive layer or coating to decrease due to ultraviolet (UV) exposure. The contact angle before such exposure may or may not be hydrophilic, but after said exposure in certain example embodiments the post-UV contact angle $\theta$ is less than about 20 degrees, more preferably less than about 15 degrees, even more preferably less than about 10 degrees, and even more preferably less than about 8 degrees.

Another object of this invention is to provide a coated article, wherein a layer of the coating includes both $sp^2$ and $sp^3$ carbon-carbon bonds and has a surface energy $Y_c$ of at least about 24 mN/m, more preferably at least about 26 mN/m, and most preferably at least about 28 mN/m.

Another object of this invention is to provide a coated article, wherein a DLC inclusive layer of the coating has an initial (i.e. prior to being exposed to environmental tests, rubbing tests, acid tests, UV tests, or the like) water contact angle $\theta$ of no greater than about 10 degrees, more preferably no greater than about 8 degrees, even more preferably no greater than about 6 degrees, and most preferably no greater than about 4 degrees. The article's initial contact angle $\theta$ may be as low as 1–3 degrees in certain embodiments. In certain embodiments the article's contact angle may increase over time upon exposure to environmental elements (as graphitic $sp^2$ C—C bonds wear off) while in other embodiments the article's contact angle may decrease over time upon such exposure.

Another object of this invention is to provide a hydrophilic DLC inclusive layer for coating a substrate. In at least one portion of the layer no more than about 70% of the bonds in that portion of the layer are of the $sp^3$ type, and more preferably no more than about 60% of the bonds are of the $sp^3$ type. A substantial portion of the remainder of the bonds may be of the graphitic or $sp^2$ type. The bonds in the layer may include, for example, carbon-carbon (C—C) bonds, carbon-nitrogen (C—N) bonds, carbon-boron (C—B) bonds, and/or carbon-hydrogen (C—H) bonds. The $sp^3$ type bonds (e.g., C—C bonds) function to increase the hardness and scratch resistance of the coating, while the graphitic $sp^2$ type bonds (e.g., C—C, C—N and/or C—B bonds) cause the coating to be more hydrophilic and have a lower contact angle.

Another object of this invention is to provide a coating which can make accumulated condensation form in a more film-wise manner; as opposed to a droplet-wise manner.

Still another object of this invention is to form amine (NH$_2$) functional groups near the surface of a hydrophobic coating or layer so as to enhance hydrophilicity.

Yet another object of this invention is to fulfill one or more of the above listed objects and/or needs.

Certain example embodiments of the instant invention fulfill one or more of the above-listed objects or needs by providing a coated glass article comprising:

a glass substrate;

a layer comprising diamond-like carbon (DLC) with sp$^3$ carbon-carbon bonds provided on said glass substrate; and wherein said layer comprising DLC is ultraviolet (UV) radiation exposed so as to cause the layer to have a contact angle θ with a drop of water thereon of no greater than about 20 degrees.

Other example embodiments of the instant invention fulfill one or more of the above-listed objects or needs by providing a method of making a coated article, the method comprising:

ion beam depositing a diamond-like carbon (DLC) inclusive layer on a substrate; and exposing the DLC inclusive layer to ultraviolet (UV) radiation in a manner sufficient to cause a contact angle θ of the DLC inclusive layer to decrease by at least about 20%.

Still further example embodiments of the instant invention fulfill one or more of the above-listed objects and/or needs by providing a coated article comprising a DLC inclusive layer supported by a glass substrate, wherein the DLC inclusive layer has a contact angle θ less than or equal to 10 degrees.

This invention will now be described with respect to certain embodiments thereof, along with reference to the accompanying illustrations.

IN THE DRAWINGS

DETAILED DESCRIPTION OF CERTAIN EMBODIMENTS OF THIS INVENTION

Figure 1:
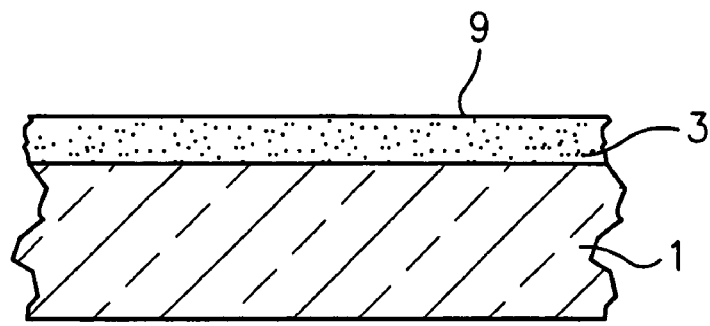
FIG. 1 is a side cross sectional view of a coated article according to an embodiment of this invention, wherein a glass or plastic substrate is provided with a hydrophilic coating thereon including a DLC inclusive layer.

Referring now more particularly to the accompanying drawings in which like reference numerals indicate like elements throughout the accompanying views.

Certain embodiments of this invention relate to improving hydrophilic qualities of a coated article (e.g., automotive windshield, automotive backlite, automotive side window, snow-mobile windshield, architectural window, mirror, etc.) by providing a diamond-like carbon (DLC) inclusive layer or coating on a substrate in a manner such that the resulting article and/or layer has hydrophilic qualities or characteristics. One way of providing DLC with hydrophilic characteristics has been found to be by doping DLC with at least one polar inducing dopant (e.g., Nitrogen (N), Boron (B), and/or any other suitable polar inducing dopant), the DLC inclusive layer may be made more polar so as to have a higher surface energy and thus be more hydrophilic.

In other embodiments of this invention, a DLC inclusive layer (e.g., having a contact angle θ from 5–100 degrees) may be exposed to ultraviolet (UV) radiation in order to lower the contact angle θ of the DLC inclusive layer to, for example, a hydrophilic range. Optionally, the DLC inclusive layer may be exposed to water at the same time as the UV exposure in order to speed up the process of contact angle θ reduction. The UV exposure embodiment may be used either in combination with, or separately from, the aforesaid doping embodiment in order to provide a hydrophilic coating.

In doping embodiments of this invention, the provision of the at least one polar inducing dopant increases the polar component of the DLC inclusive layer's surface energy, which in turn increases the layer's total surface energy. The higher the surface energy, the more hydrophilic the layer and the lower the contact angle θ. Thus, by increasing the surface energy via the dopant(s), the hydrophilicity can be improved and thus the contact angle θ can be lowered.

Combining the hydrophilicity with the use of an amorphous diamond-like carbon (DLC) layer/coating provided on the base substrate enables the resulting coated article to have a low contact angle θ as well as surface hardness and scratch resistant characteristics sufficient such that the article may be used in automotive and other high exposure environments where durability is desired.

FIG. 1 is a side cross-sectional view of a coated article according to an embodiment of this invention, wherein at least one diamond-like carbon (DLC) inclusive protective coating(s) or layer 3 is provided on substrate 1. The coated article has an exterior or outer surface 9. Substrate 1 may be of glass, plastic, ceramic, or the like.

In doping embodiments, layer or coating 3 includes at least one polar inducing dopant therein which causes bonds in the DLC inclusive layer to be more polar, which in turn causes a higher surface energy and lower contact angle θ. The dopant(s) cause more graphitic or polar sp$^2$ type bonds (e.g., C—C sp$^2$ type bonds, C—N sp$^2$ type bonds, and/or C—B s type bonds) to be formed in layer 3 so that the layer includes both sp$^2$ type and sp$^3$ type (e.g., C—C sp$^3$ type) bonds. When more bonds in layer 3 become polar, this results in water being more attracted to the layer 3 since water is polar. The tetrahedral amorphous sp$^3$ type C—C bonds (ta-C) provide the layer 3 with acceptable hardness and/or scratch resistance characteristics while the sp$^2$ type C—C and C-dopant bonds improve the layer's hydrophilicity. Preferably, a substantial portion of the carbon in layer 3 is in amorphous or disordered form (as opposed to crystalline form for example).

The dots in layer/coating 3 in FIG. 1 illustrate the dopant, which is shown as being relatively evenly or uniformly distributed throughout the thickness of layer 3. As evident from the above, exemplary polar-inducing dopants include, but are not limited to, Nitrogen (N), Boron (B), Phosphorous (P), As, S, Sb, Ga, In, and the like. Dopants such as N and B may be used either alone or in combination to dope the DLC inclusive layer 3 in certain embodiments so as to improve the layer's hydrophilicity. Layer 3 functions in a hydrophilic manner (i.e. it is characterized by low contact angles θ and/or high surface energies) so as to reduce the occurrence of bead-like condensation forming on the coated article. Hydrophilic characteristics may be advantageous in environments such as bathroom mirror surfaces, interior surfaces of automotive windshields or windows, and the like.

In UV exposure embodiments (which may be carried out in combination with doping embodiments, or without doping), DLC inclusive layer 3 may or may not have the aforesaid dopant(s) therein. More particularly, in UV exposure embodiments, the DLC inclusive layer 3 as deposited may be hydrophilic, or may be non-hydrophilic (i.e., layer 3 as deposited may have a contact angle θ of any value from 5–100 degrees). Exposure of the layer 3 to UV radiation (and optionally water) causes the contact angle of the layer 3 to decrease (e.g., to hydrophilic range(s)). Thus, following a significant amount of UV exposure, the contact angle θ of the DLC inclusive layer 3 in UV exposure embodiments is preferably less than about 20 degrees, more preferably less than about 15 degrees, even more preferably less than about 10 degrees, and most preferably less than about 8 degrees.

In certain embodiments, hydrophilic layer 3 may be from about 10 to 1,000 Angstroms thick, more preferably from about 50 to 200 Angstroms thick. In one exemplary embodiment, layer 3 may be about 100 Angstroms thick. Moreover, in certain exemplary embodiments of this invention, layer 3 has an average hardness of at least about 10 GPa, more preferably of at least about 20 GPa, even more preferably of at least about 50 GPa, and most preferably from about 50–600 GPa. In certain embodiments, layer 3 may have an average hardness of about 75 GPa. Layer 3 preferably has good abrasion resistance, a coefficient of friction of from about 0.05 to 0.20 (e.g., 0.15), and an average surface roughness of no greater than about 0.3 nm. Because of the presence of both the $sp^2$ type and $sp^3$ type bonds in layer 3, the layer preferably has a density of at least about 2.4 grams/cm$^2$ (more preferably from about 2.5 to 3.0 grams/cm$^2$). Layer 3 is preferably corrosion resistant, even in the context of significant humidity and/or heat. Layer 3 may also be inert to acids, alkalis, solvents, salts, and/or water in certain embodiments of this invention. Thus, layer 3 may act as a barrier to chemical attacks on the underlying substrate 1 (e.g., a soda-lime-silica glass substrate).

Hydrophilic layer 3 has one surface exposed to the air or the atmosphere. In doping embodiments, layer 3 after it has been doped to make it more hydrophilic, has a much lower contact angle θ with a sessile drop of water than it otherwise would without doping. In certain doping embodiments of this invention, layer 3 has an initial contact angle θ with a sessile drop of water of no greater than about 10 degrees, more preferably of no greater than about 8 degrees, even more preferably of no greater than about 6 degrees, and most preferably no greater than about 4 degrees. In certain embodiments, the contact angle may be as low as 1–3 degrees. As mentioned above, in certain UV exposure embodiments, the contact angle of layer 3 may be brought down from a non-hydrophilic range into a hydrophilic range upon exposure of the layer to significant UV rays.

In certain doping embodiments of this invention, the amount of polar inducing dopant material (one or more dopants) in hydrophilic layer 3 is from about 1–30%, atomic percentage, more preferably from about 1–10%, even more preferably from about 1–5%, and most preferably from about 1–4%. In certain embodiments, polar inducing dopant (s) in layer 3 may represent about 3–4% (atomic) of the atoms in layer 3. The remainder may be C and/or H in certain embodiments. In certain instances, it has been found that increasing the dopant percentage by too much can decrease the diamond like properties of the layer 3, making the layer too graphitic for practical applications in certain circumstances (e.g., the more graphitic the coating the darker and less transmissive/transparent it becomes). Since the DLC inclusive layer 3 is only doped with low amounts of polar inducing dopant(s) such as B and/or N, much of the diamond-like nature of the bonding in layer 3 is preserved. Other types of dopant (e.g., H is not a polar inducing dopant) may or may not be provided in layer 3 in certain embodiments.

Thirteen exemplary make-ups of a doped hydrophilic layer 3 are set forth below in Chart No. 1, these exemplary make-ups being applicable to any doping embodiment herein including any of the embodiments of FIGS. 1–3.

CHART NO. 1

| Atomic % C | Atomic % N | Atomic % B | Polar Component | Atomic % H |
|---|---|---|---|---|
| 97 | 1.5 | 1.5 | 6 | 0 |
| 97 | 2.1 | 0.9 | 10 | 0 |
| 96 | 3.0 | 1.0 | 7 | 0 |
| 87 | 2.1 | 0.9 | — | 10.0 |
| 89 | 2.0 | 1.0 | — | 8.0 |
| 96 | 4.0 | 0.0 | — | 0 |
| 97 | 0 | 3.0 | — | 0 |
| 70 | 10.0 | 0 | — | 20.0 |
| 75 | 0 | 5.0 | — | 20.0 |
| 71 | 7 | 0 | — | 22.0 |
| 69 | 6 | 0 | — | 25.0 |
| 68 | 0 | 8 | — | 24.0 |
| 67 | 9 | 0 | — | 25.0 |

Layers or films 3 doped independently with either N or B have been found to be hydrophilic. However, it has also been found that additional surprising hydrophilic properties may result when a mixture of dopants (e.g., N and B) is used to dope DLC inclusive layer 3. In certain embodiments, the ratio of N to B may be approximately 2:1 (N:B). Other dopants may of course be used; and in UV exposure embodiments dopants are optional.

Optical characteristics of layer 3, such as n & k refractive indices, and Tauc optical bandgap, can be tailored/adjusted by changing the concentration or percentage of dopants (e.g., N and/or B) in the layer/film. The optical bandgap may be varied between 1.75 and 3.2 eV in certain embodiments. The "n" refractive index at 550 nm may be varied between, for example, 1.6 and 2.3, while the "k" refractive index at 550 nm may be varied between, for example, 0.01 and 0.1 in certain embodiments (permittivity at GHz 4.7). In certain embodiments, a high bandgap (e.g., above 3 eV) and/or an absorption coefficient greater than about $10^6$ cm$^{-1}$ implies that such films/layers 3 are ultraviolet (UV) absorbing.

Strong binding energy also implies strong UV radiation resistance. In certain embodiments, UV transmission of layer 3 at 350 nm is no greater than about 40% (preferably no greater than about 35%).

In FIG. 1 doping embodiments, the dopant(s) may be distributed in a fairly uniform manner throughout the thickness of layer 3, as illustrated. For example, dopant inclusive gas may be provided in an ion deposition apparatus throughout the entire course of the deposition process for layer 3.

Figure 2:
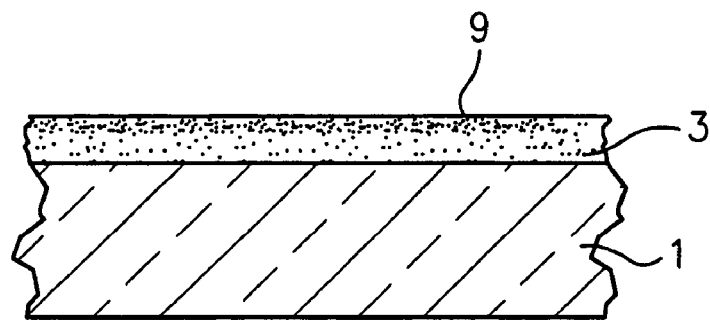
FIG. 2 is a side cross sectional view of a coated article according to another embodiment of this invention, wherein a glass or plastic substrate is provided with a hydrophilic coating thereon including a DLC inclusive layer.

In the FIG. 2 embodiment, the dopant(s) is/are not uniformly distributed throughout the entire thickness of hydrophilic layer 3. Instead, a more significant portion of dopant (s) is provided near the exterior surface of layer 3 than near the interface between layer 3 and substrate 1, as shown in FIG. 2. The presence of the dopant(s) at or near the exterior surface of layer 3 enables the bonds near the layer's surface to be more graphitic. Thus, layer 3 still has the hydrophilic properties described herein (e.g., low contact angle(s)). For example, in certain embodiments the outermost 10 angstrom (A) thick portion (or 10 nm thick portion in other embodiments) of layer 3 may include at least about 3% dopant atoms (e.g., N, B, P, As, Sb, Ga, and/or In), more preferably at least about 5%, and most preferably at least about 7%. The provision of these polar inducing dopant atoms near the coating's surface results in a more polar coating surface. The rest of layer 3 (i.e., the middle of layer 3 and/or the portion of layer 3 adjacent the substrate or some intermediate layer) may be of or include undoped DLC in certain embodiments, or alternatively may be of or include DLC doped with Si, O, or H. This enables many of the graphitic $sp^2$ type bonds to be located at or near the exterior surface of layer 3. Too many $sp^2$ type bonds in layer 3 can undesirably reduce its transparency or transmission characteristics, so in some embodiments it may be desirable to minimize the presence of $sp^2$ type bonds at locations other than at or near the exterior surface where they are needed to lower the contact angle θ of the layer 3.

In an exemplary embodiment of this invention (see the tenth listed exemplary make-up listed above in Chart No. 1), where the C is doped with N and H, it has been found that the provision of the N causes amine ($NH_2$) functional groups to be formed at or near the surface of layer 3. In such amine groups, for example, one of the N bonds is with a C ($sp^2$) while the other two N bonds are with H. These amine groups enhance the hydrophilic nature of the layer 3 and thus of the coated article. In exemplary amine inclusive embodiments, the layer may include from about 60–84% C, from about 1–12% B, and from about 4–39% H (atomic); and more preferably from about 65–75% C, from about 5–10% B, and from about 15–30% H.

Figure 3:
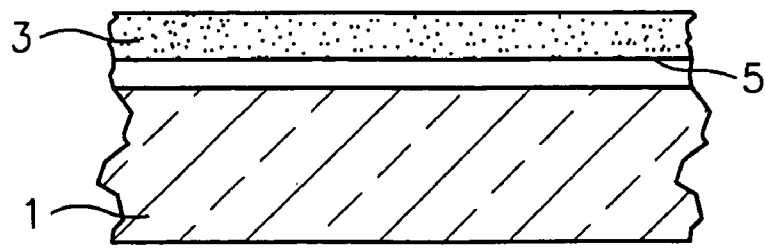
FIG. 3 is a side cross sectional view of a coated article according to another embodiment of this invention, wherein a glass or plastic substrate is provided with a hydrophilic coating thereon including a DLC inclusive layer.

FIG. 3 illustrates that in certain embodiments of this invention, at least one intermediate layer 2 may be provided between substrate 1 and the one or more hydrophilic layer(s) 3. Thus, both layer(s) 3 and layer(s) 2 are deposited on, and provided on, substrate 1 in this embodiment. Any desired layer may be utilized as an intermediate layer 2. For example, intermediate layer 2 may include a low-E layering system, another DLC inclusive layer, a silicon oxide layer, a silicon nitride layer, and/or a titanium oxide layer in certain embodiments of this invention. The term "on" (with regard to a layer being "on" a substrate or other layer) herein means supported by, regardless of whether or not other layer(s) are provided therebetween. Thus, for example, DLC inclusive layer 3 may be provided directly on substrate 1 as shown in FIGS. 1–2, or may be provided on substrate 1 with a low-E or other layer(s) therebetween as shown in FIG. 3. Exemplary layer systems (in full or any portion of these coatings) that may be used as low-E or other coating(s) 2 on substrate 1 between layer 3 and the substrate are shown and/or described in any of U.S. Pat. Nos. 5,837,108, 5,800,933, 5,770,321, 5,557,462, 5,514,476, 5,425,861, 5,344,718, 5,376,455, 5,298,048, 5,242,560, 5,229,194, 5,188,887 and 4,960,645, which are all hereby incorporated herein by reference.

In certain embodiments, in at least one portion of DLC inclusive layer 3 no more than about 70% of the bonds in the layer are of the $sp^3$ type, and more preferably no more than about 60% of the bonds in the layer are of the $sp^3$ type, so that this portion of the layer may attain hydrophilic characteristics. In certain preferred embodiments, no more than about 50% of the bonds in layer 3 are of the $sp^3$ type (e.g., $sp^3$ type C—C bonds), or in other embodiments this may be the case only near the exterior or outer surface of layer 3. A substantial portion of the remainder of the bonds are of the graphitic or $sp^2$ type. The bonds in the layer may include, for example, carbon-carbon (C—C) bonds, carbon-nitrogen (C—N) bonds, carbon-boron (C—B) bonds, and/or carbon-hydrogen (C—H) bonds. The $sp^3$ type bonds (e.g., C—C bonds) function to increase the hardness and scratch resistance of the coating, while the graphitic $sp^2$ type bonds (e.g., C—C, C—N and/or C—B bonds) cause the coating to be more hydrophilic and have a lower contact angle. It has been found that different techniques may be used to increase the number of graphitic $sp^2$ type bonds, including but not limited to a) doping as discussed herein, b) heating up the underlying substrate during the layer 3 deposition process, and/or c) utilizing a higher ion energy eV energy during the layer 3 deposition process (e.g., from about 200–600 eV, most preferably from about 375 to 425 eV). Also, the amine functional groups discussed above may also function to enhance the hydrophilic nature of the article. A higher eV energy used during the ion deposition process of layer 3 results in less $sp^3$ type bonds and more $sp^2$ type bonds. Techniques b) and/or c) may be used in combination with the doping herein to obtain hydrophilic characteristics.

In certain embodiments, DLC inclusive layer 3 and/or the coating system on substrate 1 is/are at least about 75% transparent to or transmissive of visible light rays, preferably at least about 85%, and most preferably at least about 95%.

When substrate 1 is of glass, the glass may be from about 1.5 to 5.0 mm thick, preferably from about 2.3 to 4.8 mm thick, and most preferably from about 3.7 to 4.8 mm thick. Conventional soda lime silica glass may be used as substrate 1 in certain embodiments, such glass being commercially available from Guardian Industries, Corp., Auburn Hills, Mich. In certain other embodiments of this invention, substrate 1 may be of borosilicate glass, or of substantially transparent plastic. In still further embodiments, an automotive window (e.g. windshield, backlite, or side window) including any of the above glass substrates laminated to a plastic substrate may combine to make up substrate 1, with a coating system of any of FIGS. 1–3 provided on a surface of such a substrate to form the window. In other embodiments, substrate 1 may include first and second glass sheets of any of the above mentioned glass materials laminated to one another, for use in window (e.g. automotive windshield, residential window, commercial architectural window, automotive side window, vacuum IG window, automotive backlite or back window, etc.) and/or other environments.

When substrate 1 of any of the aforesaid materials is coated with at least DLC inclusive layer 3 according to any of the FIGS. 1–3 embodiments, the resulting coated article has the following characteristics in certain example non-limiting embodiments: visible transmittance (Ill. A) greater than about 60% (preferably greater than about 70%, and most preferably greater than about 80%), UV (ultraviolet) transmittance less than about 38%, total solar transmittance less than about 45%, and IR (infrared) transmittance less than about 35% (preferably less than about 25%, and most preferably less than about 21%). Visible, "total solar", UV, and IR transmittance measuring techniques are set forth in U.S. Pat. No. 5,800,933.

Figure 4:
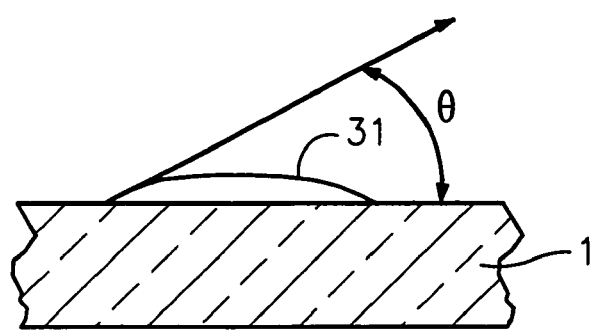
FIG. 4 is a side cross sectional partially schematic view illustrating a contact angle θ of a drop (e.g., sessile drop of water) on an uncoated glass substrate.
Figure 5:
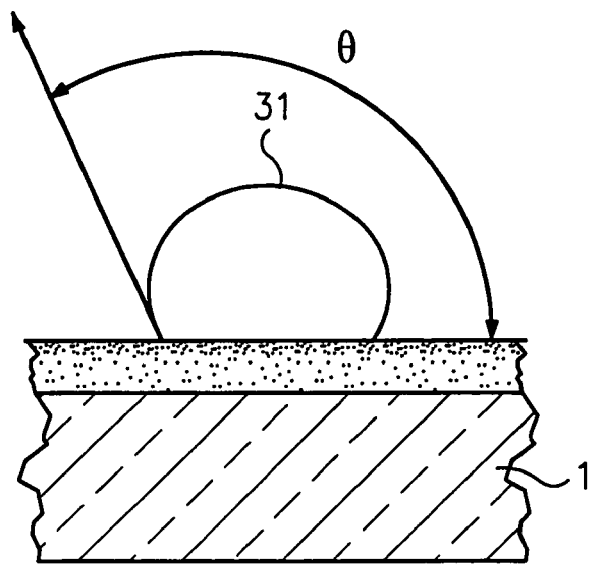
FIG. 5 is a side cross sectional partially schematic view illustrating a high contact angle θ of a drop on a coated article including a hydrophobic coating of, for example, an article disclosed in related application Ser. No. 09/442,805.
Figure 6:
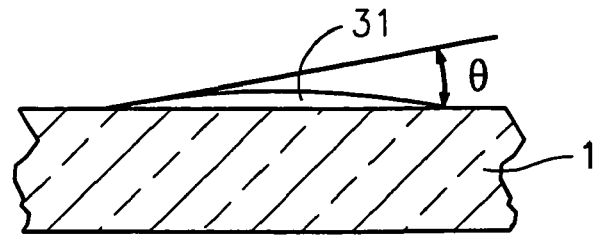
FIG. 6 is a side cross sectional partially schematic view illustrating a low contact angle θ of a drop (e.g., sessile drop of water) on a coated article according to an embodiment of this invention.

Hydrophilic performance of coating/layer 3 in any of the above embodiments is a function of contact angle θ, surface energy Y, and/or wettability or adhesion energy W. The surface energy Y of layer 3 may be calculated by measuring its contact angle θ. Exemplary contact angles θ are illustrated in FIGS. 4–6. A hydrophilic coating or layer system 3 according to an embodiment of this invention is on the substrate of FIG. 6, while no coating of any kind is on the substrate of FIG. 4 and a hydrophobic coating is on the substrate of FIG. 5. No coatings are illustrated in FIGS. 4 and 6 for purposes of simplicity. To measure contact angle in one embodiment, a sessile drop 31 of a liquid such as water is placed on the substrate as shown in FIGS. 4–6. A contact angle θ between the drop 31 and underlying article appears, defining an angle θ depending upon the interface tension between the three phases at the point of contact. The contact angle is greater in FIG. 5 than in FIG. 4, because the coating layer on the substrate in FIG. 5 is hydrophobic (i.e., results in a higher contact angle). However, due to this invention, the contact angle θ in FIG. 6 is much lower than in either of FIGS. 4–5.

Generally, the surface energy $Y_c$ of a layer 3 or any other article/layer can be determined by the addition of a polar and a dispersive component, as follows: $Y_c=Y_{CP}+Y_{CD}$, where $Y_{CP}$ is the layer's/coating's polar component and $Y_{CD}$ the layer's/coating's dispersive component. The polar component of the surface energy represents the interactions of the surface mainly based on dipoles, while the dispersive component represents, for example, van der Waals forces, based upon electronic interactions. Generally speaking, the higher the surface energy $Y_c$ of layer 3, the more hydrophilic the layer (and coated article) and the lower the contact angle θ.

Adhesion energy (or wettability) W can be understood as an interaction between polar with polar, and dispersive with dispersive forces, between the exterior surface 9 of the coated article and a liquid thereon such as water. $Y^P$ is the product of the polar aspects of liquid tension and article tension; while $Y^D$ is the product of the dispersive forces of liquid tension and article tension. In other words, $Y^P=Y_{LP}*Y_{CP}$; and $Y^D=Y_{LD}*Y_{CD}$; where $Y_{LP}$ is the polar aspect of the liquid (e.g. water), $Y_{CP}$ is the polar aspect of coating/layer 3; $Y_{LD}$ is the dispersive aspect of liquid (e.g. water), and $Y_{CD}$ is the dispersive aspect of coating/layer 3. It is noted that adhesion energy (or effective interactive energy) W, using the extended Fowkes equation, may be determined by:

$$W=[Y_{LP}*Y_{CP}]^{1/2}+[Y_{LD}*Y_{CD}]^{1/2}=Y_l(1+\cos\theta),$$

where $Y_l$ is liquid tension and θ is the contact angle. W of two materials (e.g. layer 3 and water thereon) is a measure of wettability indicative of how hydrophilic the layer or coated article is.

When analyzing the degree of hydrophilicity of layer 3 or a coated article herein with regard to water, it is noted that for water $Y_{LP}$ is 51 mN/m and $Y_{LD}$ is 22 mN/m. In certain embodiments of this invention, the polar aspect $Y_{CP}$ of surface energy of layer 3 is at least about 5, and more preferably at least about 7, and most preferably from about 7–10 (variable or tunable between 5 and 15 in certain embodiments) and the dispersive aspect $Y_{CD}$ of the surface energy of layer 3 is from about 16–22 mN/m (more preferably from about 18–20 mN/m).

Using the above-listed numbers, according to certain embodiments of this invention, the surface energy $Y_C$ of layer 3 is at least about 24 mN/m, more preferably at least about 26 mN/m, and most preferably at least about 28 mN/m; and the adhesion energy W between water and layer 3 is at least about 600 mN/m, more preferably from about 700–1,300 mN/m, even more preferably from about 750–950 mN/m, and most preferably from about 800–950 mN/m. These high values of adhesion energy W and layer 3 surface energy $Y_C$, and the low initial contact angles θ achievable, illustrate the improved hydrophilic nature of coated articles according to different embodiments of this invention.

The initial contact angle θ of a conventional glass substrate 1 with sessile water drop 31 thereon is typically from about 22–24 degrees, as illustrated in FIG. 4 (although it may be as low as 18 degrees in certain instances). Thus, conventional glass substrates are not as hydrophilic as embodiments of this invention. Moreover, layers 3 herein provide for scratch resistance and/or high durability. A normal ta-C layer, undoped, on a glass substrate is not as hydrophilic as embodiments of this invention. Inventions herein enable the contact angle of a ta-C inclusive layer 3 to be reduced to improve the hydrophilicity of a coated article, as shown by the low contact angle θ in FIG. 6.

Another advantage associated with certain layers 3 according to certain embodiments of this invention is that the layer 3 may become electrically conductive so as to reduce the likelihood of a build-up of static electricity. This reduction in resistivity is believed to be due to the doping described herein. For example, prior to doping resistivity of a ta-C layer may be, e.g., $10^8$ ohms/cm, whereas after doping the resistivity may drop to, e.g., less than about 500 ohms/cm, more preferably less than about 100 ohms/cm, most preferably from about 0.01 to 50 ohms/cm.

Layer 3 may have a dielectric constant of from about 8 to 12 at 10 kHz, preferably about 10, and may have a dielectric constant of about 2 to 6 at 100 MHz, preferably about 4. In certain embodiments, layer 3 may have an electrical breakdown strength (V cm$^{-1}$) of about $10^6$. As for thermal properties, layer 3 may have a thermal coefficient of expansion of about $9\times10^{-6}$/C, and a thermal conductivity of about 0.1 Wcm K.

Figure 7:
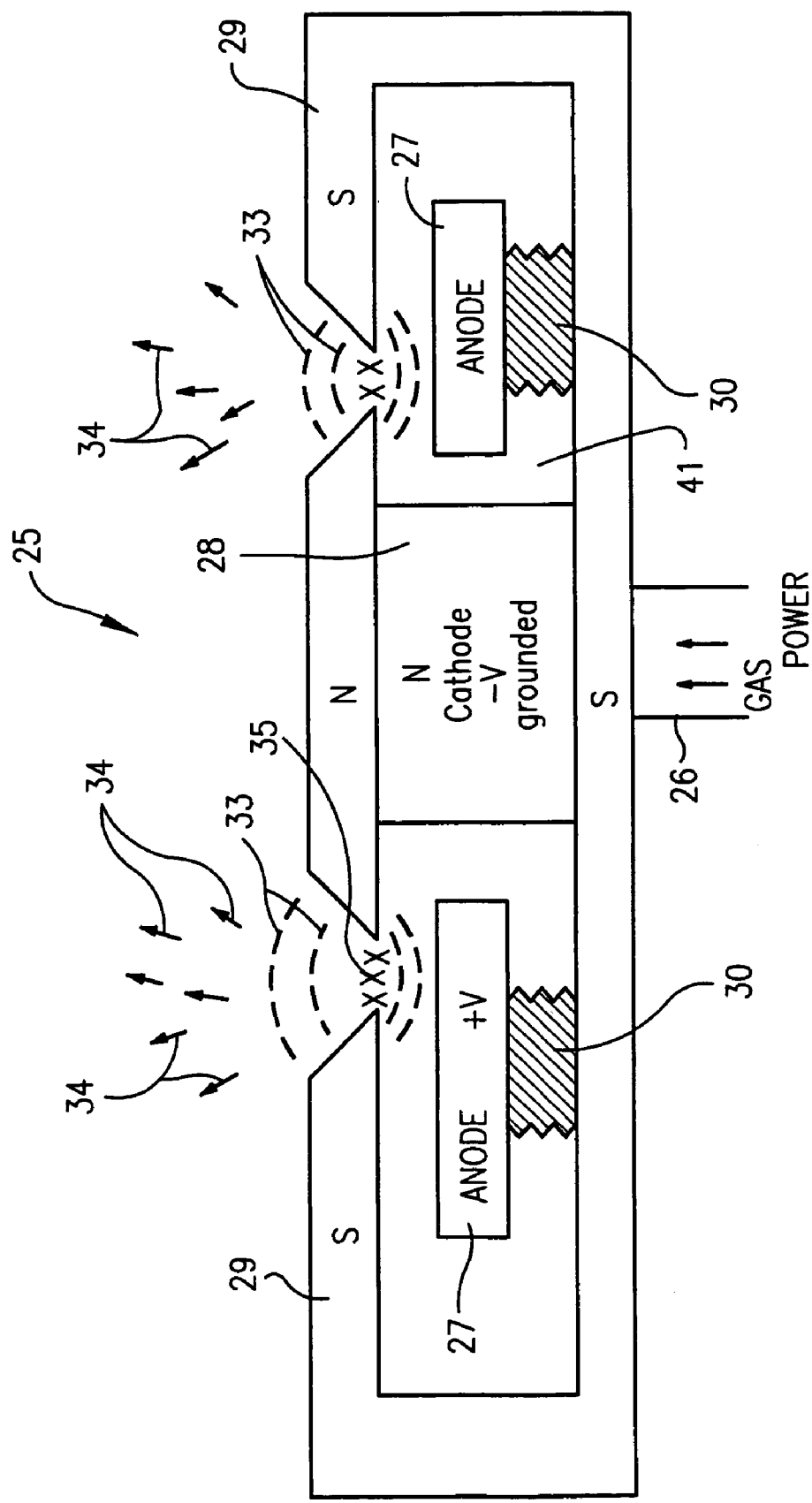
FIG. 7 is a side cross sectional view of a linear ion beam source which may be used in any embodiment of this invention for depositing a DLC inclusive hydrophilic layer (s).
Figure 8:
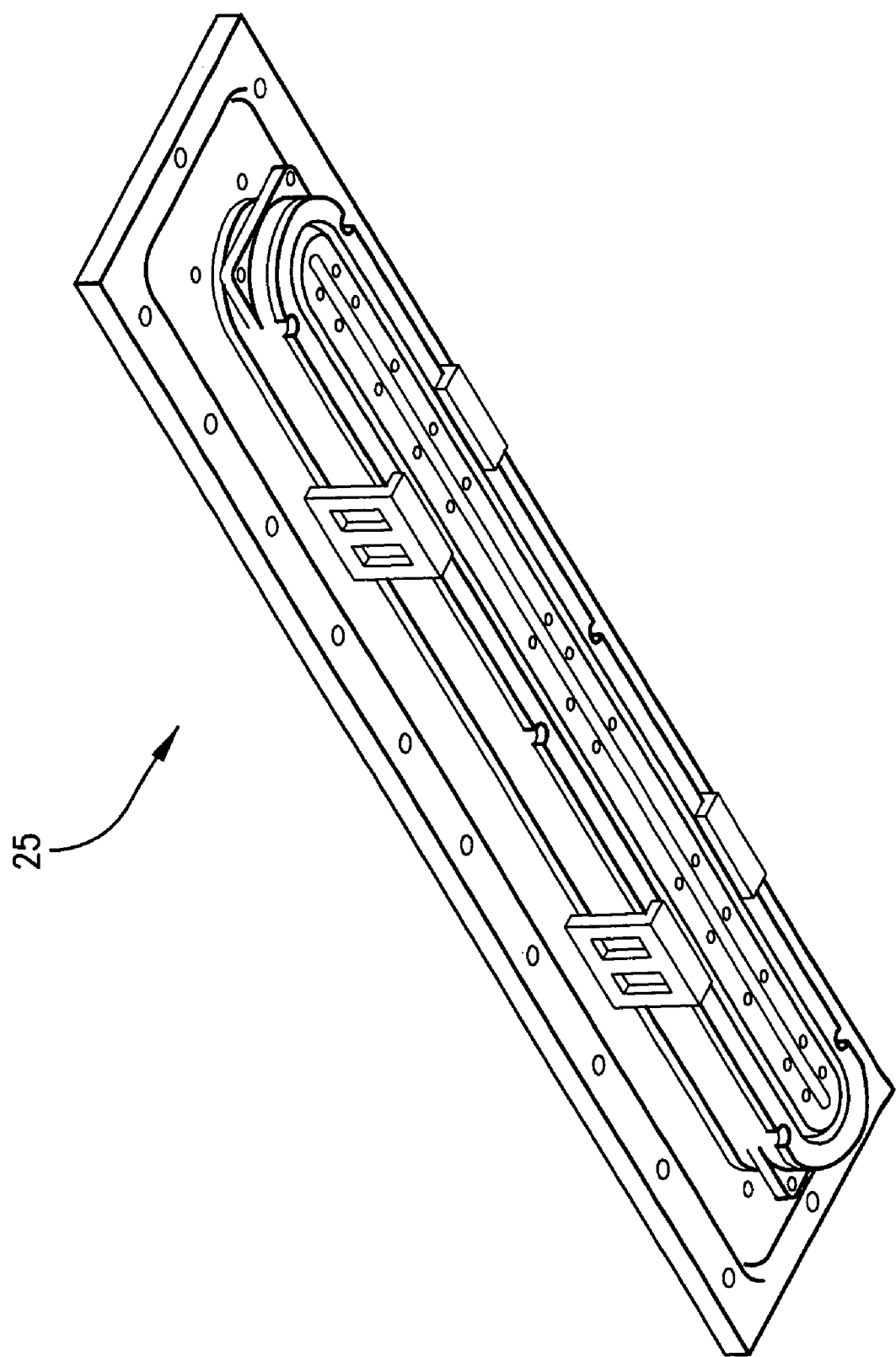
FIG. 8 is a perspective view of the linear ion beam source of FIG. 7.

FIGS. 7–8 illustrate an exemplary linear or direct ion beam source 25 which may be used to deposit layer(s) 3, clean a substrate 1, or surface plasma treat a DLC inclusive layer to add doping atoms thereto according to different embodiments of this invention. Ion beam source 25 includes gas/power inlet 26, racetrack-shaped anode 27, grounded cathode magnet portion 28, magnet poles 29, and insulators 30. A 3 kV DC power supply may be used for source 25 in some embodiments. Linear source ion deposition allows for substantially uniform deposition of DLC inclusive layer 3 as to thickness and stoichiometry.

Ion beam source 25 is based upon a known gridless ion source design. The linear source is composed of a linear shell (which is the cathode and grounded) inside of which lies a concentric anode (which is at a positive potential). This geometry of cathode-anode and magnetic field 33 gives rise to a close drift condition. The magnetic field configuration further gives rise to an anode layer that allows the linear ion beam source to work absent any electron emitter. The anode layer ion source can also work in a reactive mode (e.g., with oxygen and/or nitrogen). The source includes a metal housing with a slit in a shape of a race track as shown in FIGS. 7–8. The hollow housing is at ground potential. The anode electrode is situated within the cathode body (though electrically insulated) and is positioned just below the slit. The anode can be connected to a positive potential as high as 3,000 volts. Both electrodes may be water cooled in certain embodiments.

Feedstock gases are fed through the cavity 41 between the anode and cathode. The linear ion source also contains a labyrinth system that distributes the precursor gas evenly along its length and which allows it to supersonically expand between the anode-cathode space internally. The electrical energy then cracks the gas to produce a plasma within the source. The ions are expelled out and directed toward the substrate 1 on which the layer(s) 3 is to be grown. The ion beam emanating from the slit is approximately uniform in the longitudinal direction and has a gaussian profile in the transverse direction. Exemplary ions 34 are shown in FIG. 7. A linear source as long as 0.5 to 3 meters may be made and used, although sources of different lengths are anticipated in different embodiments of this invention. Electron layer 35 is shown in FIG. 7 and completes the circuit thereby enabling the ion beam source to function properly.

Exemplary methods of depositing a DLC inclusive hydrophilic layer 3 over top of and on a substrate 1 (the substrate may have other layer(s) (e.g., layer 2) already provided thereon) will now be described. These methods are for purposes of example only and are not intended to be limiting. The energies used during the deposition process of layer 3 and/or the directionality provided by the ion beam deposition techniques enable layer 3 to be fairly uniformly deposited over all aspects of the underlying structure.

Prior to layer 3 being formed on substrate 1, the top surface of substrate 1 may be cleaned by way of a first linear or direct ion beam source. For example, a glow discharge in argon (Ar) gas or mixtures of Ar/$O_2$ (alternatively $CF_4$ plasma) may be used by the source to remove any impurities on the substrate surface. Preferably, no oxygen or fluorocarbons are used since in the next step doping with N and/or B atoms takes place. Such interactions are physio-chemical in nature. The power density may be, for example, 1 Watt/$cm^2$. Substrate 1 may also be cleaned by, for example, sputter cleaning the substrate prior to actual deposition of layer 3. While cleaning may be performed in some embodiments, it need not be performed in other embodiments of this invention.

Then, the deposition process for DLC inclusive layer 3 on substrate 1 may be performed using the linear ion beam source and corresponding deposition technique as illustrated in FIGS. 7–8 (e.g., see linear ion beam 25). The ion beam source 25 (which may be the same or a different source than the cleaning ion beam source) functions to deposit a ta-C inclusive layer 3 (hydrogenated in certain embodiments) on substrate 1, along with dopants (e.g., N and/or B) therein. Exemplary feedstock gases which may be used include Nitrogen gas, diborane gas, and/or $C_2H_2$ gas.

Alternatively, layer 3 may be deposited using a filtered cathodic vacuum arc ion beam apparatus (FCVA-IB) as disclosed in "*Tetrahedral Amorphous Carbon Deposition, Characterisation and Electronic Properties*", by Veerasamy, Cambridge 1994 (incorporated herein by reference). This deposition process may be achieved just after a plasma clean of the substrate 1 using the same deposition chamber, or another chamber. In such techniques, a cathodic arc discharge of an ultrapure carbon target may be triggered in a base vacuum of, e.g., <$10^{-6}$ Torr. A target consisting essentially of Hoescht carbon may be machined into a cylindrical electrode about 90 mm in diameter and about 50 mm deep. Conditions of arc discharge may be, e.g., 70 A and 17 V. The pressure during the cathodic arc process may be in the range of a tenth of a mTorr. One, two, or more dopant gas(es) may be simultaneously introduced into the toroidal bend region. Exemplary gases may be diborane (including a dopant B) and Nitrogen. Gas flows may be controlled by two mass flow controllers in series with a needle valve. The diborane gas may be independently flowed through such a controller. The power is coupled by plasma collisions to the dopant gas diborane and Nitrogen mixture which may be introduced via a mass flow controller at the bend of the magnetic filter. An exemplary torroidal magnetic field may be 100 mTesla. The energetic carbon ions and high energy electrons together with the UV radiation produced by the arc dissociate(s) the gas mixture into extremely reactive energetic ions. In general, only ionized species (e.g., C, N, and B) are constrained to follow the toroidal magnetic field in the filter while the neutrals and macroparticles are filtered out. The flux of ionized atoms is/are transported to the growth surface on the substrate 1 so that layer 3 is formed. The ion energy can be independently varied by a grid which has a negative potential or RF bias on the substrate to tune the physical properties of the layer 3. The range of self bias potential is from, for example, −1,000 to +1,000 V. In certain embodiments, a window of 120–200 V per ion species may be used. Partial pressures used during the deposition may be, for example, from $10^{-6}$ to $10^{-4}$ Torr. Exemplary parameters which may be used in such a deposition process are: base pressure of $10^{-6}$, $N_2$ gas 0–5 sccm, $B_2H_4$ gas 0–2 sccm, a room temperature for substrate 1, and an arc power of 1,000 W. In such a manner, layer 3 including amorphous DLC doped with B and/or N may be formed on substrate 1.

The hydrophilic nature of layer 3 may be enhanced in certain embodiments by using a plasma treatment or grafting procedure which adds certain polar functional groups at the surface of layer 3, altering the chemical reactivity at the surface while the bulk properties of the layer remain substantially unaffected. In such embodiments, a plasma of Nitrogen gas ($N_2$) may be used at a pressure of about 1 mT to enhance the hydrophilic nature.

In one instance, ta-C films having thicknesses from 10 to 50 nm were deposited on quartz substrates with an interdigitated planar array of 20 μm Ni electrodes. These electrodes were prepared by conventional lithographic techniques. The influence of the adsorbed molecules on the electrical properties of the ta-C doped films were then studied using I-C-V characteristics. Strong sensitivity of the I-C-V characteristics were found in the presence of water and alcohol. The high sensitivity of the capacitance on water vapor concentration as well as the quick response to water molecules suggested a high polar component of the surface bonds. A layer 3 of ta-C:N:B also has a high density as evidenced by its high plasmon peak at about 32.9 eV.

When it is desired to hydrogenate layer 3, for example, a dopant gas may be produced by bubbling a carrier gas (e.g. $C_2H_2$) through the precursor monomer (e.g. TMS or 3MS) held at about 70 degrees C (well below the flashing point). Acetylene feedstock gas ($C_2H_2$) is used in certain embodiments to prevent or minimize/reduce polymerization and to obtain an appropriate energy to allow the carbon and/or hydrogen ions to penetrate the article and subimplant therein, thereby causing the layer 3 to grow. Other suitable gases, including polar inducing dopant gases, may also be used in the source to create the ions 34.

As mentioned above, in addition to doping, it has been found that the layer 3 may be made more hydrophilic in nature as a function of how it is deposited on substrate 1. The temperature of substrate 1 may be raised during the deposition process (e.g., to about 100–300 degrees C.). An alternative way in which to make the layer more hydrophilic is to increase the ion energy used during the deposition process, e.g., to about 200 to 500 eV, most preferably about 400 eV, in order to reduce $sp^3$ bonding content in the layer 3. In other embodiments of this invention (doping and/or UV exposure embodiments), a base portion of layer 3 may be ion beam deposited at a rather high ion energy (e.g., 750–1500 eV per two C atoms) and then for deposition of the top portion of the layer 3 the ion energy is lowered to a lower level (e.g., from 10–200 eV per two C atoms) to provide more $sp^2$ C—C bonds at the surface of layer 3.

While ion beam deposition techniques are preferred in certain embodiments, other methods of deposition may also be used in different embodiments. For example, filtered cathodic vacuum arc ion beam techniques may be used to deposit layer 3 as discussed above. Moreover, sputtering techniques may also be used to deposit layer 3 on substrate 1 in other embodiments.

Figure 9:
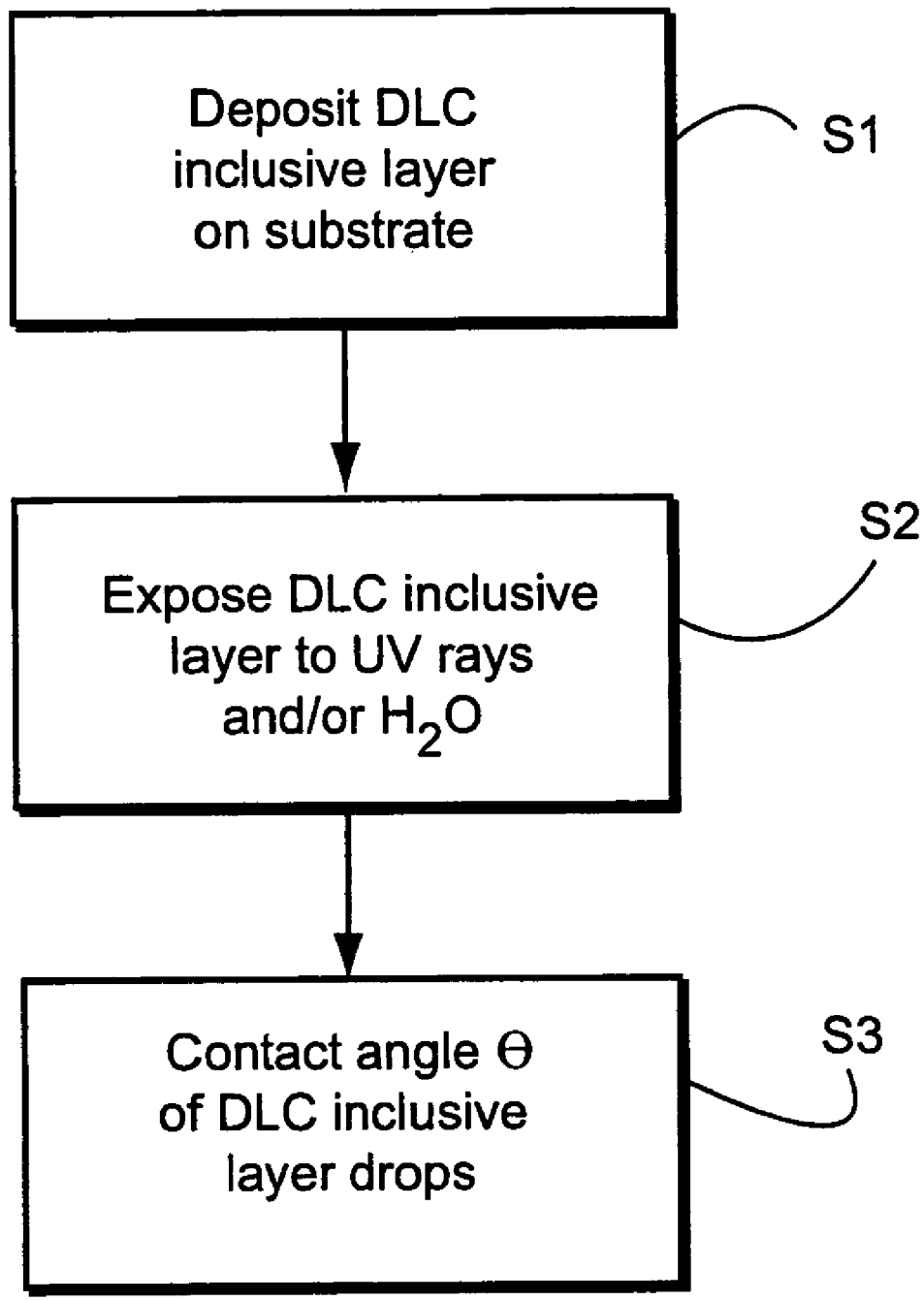
FIG. 9 is a flowchart illustrating steps taken according to another embodiment of this invention where a DLC inclusive layer is exposed to ultraviolet (UV) light/radiation in order to lower contact angle θ thereof.

FIG. 9 is a flowchart illustrating steps taken according to ultraviolet (UV) exposure embodiments of the instant invention (which may or may not be doped in different embodiments of this invention). Initially, a DLC inclusive layer 3 is ion beam deposited on a substrate 1 in step S1. The DLC inclusive layer 3 may or may not be doped as described above. Other than the potential for not being doped, DLC inclusive layer 3 is as described in any of the aforesaid embodiments of the instant invention. Layer 3 as originally deposited may or may not be hydrophilic; e.g., the layer 3 may have a contact angle θ anywhere in the range of from 5–100 degrees. The DLC inclusive layer 3 may be deposited directly on substrate 1 (see FIG. 1), or alternatively on the substrate 1 over another layer(s) as described above (see FIG. 3). Following deposition of DLC inclusive layer 3, the layer 3 is exposed to UV radiation/rays in step S2. This exposure to UV radiation may be carried out during the process of manufacture (e.g., a UV source for emitting UV rays toward layer 3 may be located on an apparatus following the ion beam source used for depositing layer 3), and/or alternatively the UV exposure may take place in ambient atmosphere (e.g., letting the coated article with layer 3 thereon sit outside in the sun/rain). In either case, the DLC inclusive layer 3 is exposed to UV radiation which causes the contact angle θ of the layer 3 to decrease. Optionally, water may be applied to the layer 3 during the UV exposure to speed up the contact angle reducing process. The resulting decrease in contact angle θ is illustrated in step S3.

It is noted that UV A seems to work well is exposing the layer 3 to cause decrease in contact angle. The "A" type (lower energy) of UV is wavelengths in the range of from 315–380 nm (near UV). Following and/or during UV exposure, the film remain scratch resistant and hard (e.g., even after 600 hrs. QUV), and film thickness does not substantially change (i.e., does not change by more than 0–5%).

It is believed that UV exposure of the DLC inclusive layer 3 results in oxidation and causes a thin carbon-oxide layer/portion to form at the surface of the layer 3 (e.g., including —C=O and/or O—C=O bonds). This thin at least partially oxidized surface layer portion has a fair amount of attraction to water molecules (polar bonds), thus explaining its hydrophilicity. This thin carbon oxide inclusive layer/portion may be from about 1–30 Å thick, more likely/preferably about 5–15 Å thick (in this regard, the high frequency of dots in layer 3 in FIG. 2 can be used to represent this thin carbon oxide portion at the top surface of overall layer 3; in a sense the UV is causing the DLC layer 3 surface to become doped with oxygen). This thin carbon oxide portion is believed to seal off the remainder of the layer 3 from the ambient atmosphere, so as to prevent further oxidation (i.e., the bulk of the hard $sp^3$ carbon-carbon bonds in the bulk of the layer 3 are thus resistant to oxidation so that the layer maintains its scratch resistance and the like). This sealing off prevents degradation of the bulk of layer 3, while at the same time providing hydrophilic properties (i.e., low contact angle). The layer upon UV exposure also has less propensity for dust to be attracted thereto.

UV EXPOSURE EXAMPLE

The following Example was performed for purposes of illustrating one non-limiting implementation of a UV exposure embodiment of this invention pursuant to FIG. 9. On a 2 mm thick clear glass substrate, a DLC layer 3 was ion beam deposited to a thickness of 14.69 angstroms (Å) using acetylene ($C_2H_2$) feedstock gas (145 sccm) at a linear velocity of 100 inches/minute, at 2970 V and 0.57 amps. The layer 3 was not doped with any of the dopants B, N, etc. above. The results was a DLC layer 3 of a-taC:H, having an initial contact angle θ of 73.47 degrees. Then, the coated article was QUV exposed for 86 hours (combination of UV radiation and water). The QUV machine was set for cycles of two (2) hours heat (about 60 degrees C.) and humidity (i.e., water) followed by two (2) hours of UV light exposure (the UV light/radiation was from UVA-340 fluorescent bulbs that match the UV spectrum of sunlight as well). Following the QUV exposure, the coated article including substrate 1 with DLC layer 3 thereon had a contact angle θ which had dropped all the way down to 19.12 degrees; Thus, it can be seen that the contact angle decreased by about 74% (i.e., 73.47−19.12=54.35; and 54.35/73.47=0.7398 or about 74%). Further UV exposure would allow the contact angle to drop even further. Thus, the DLC layer 3 as deposited was not hydrophilic, but after significant UV exposure the contact angle θ of the article had dropped down into the hydrophilic range (i.e., less than 20 degrees). It can be seen that the UV exposure caused the contact angle of the layer 3 to significantly drop into the hydrophilic range of <=20 degrees.

In certain example embodiments of this invention, the DLC inclusive layer 3 is exposed to UV radiation (and optionally water/humidity) in a manner (e.g., amount of UV exposure) sufficient to cause the contact angle θ of the layer 3 to decrease by at least about 20%, more preferably by at least about 30%, even more preferably by at least about 50%, and in certain cases (see Example above) by at least about 70%.

It is noted that The term "QUV" herein means that the coated article is exposed to UV radiation and water, using a QUV Accelerated Weathering Tester available from "The Q-Panel Company, Cleveland, Ohio" to simulate sunlight/rain/humidity. This QUV machine exposes the coated article to UV radiation/light using fluorescent UV lamps, and simulates rain and dew with condensing humidity. Coated articles are tested using QUV by exposing them to alternating cycles of light and moisture at controlled, elevated temperatures (typically from 50–90 degrees C.). During the condensation cycle, a water reservoir in the bottom of the test chamber is heated to produce vapor; and the hot vapor keeps the chamber at about 100% relative humidity.

Advantages of certain embodiments of this invention include, for example, any advantage listed above, the hydrophilic nature of the article/layer, the ability of the layer 3 to withstand high temperatures without burning, the reduction of resistance so as to reduce the likelihood of static buildup, the fact that the deposition process may be performed at low temperature(s) such as room temperature in certain embodiments, the high deposition rates which may be used (e.g., >2 nm/s), the fact that the deposition process is scalable to large area deposition (e.g., >1 square meter), the high throwing power of the deposition apparatus in its capability of coating to within 5–8% on curved surfaces of a substrate 1, the smooth nature of layer 3 absent many if any pinholes, the ability to realize conformal growth of layer 3, the ability to use layer 3 in combination with other underlying layers such as low-E layers or silicon nitride layers or silicon oxide layers, and/or the ability to tune the layer's properties by varying the ion energy and/or gases used during the deposition process.

Once given the above disclosure, many other features, modifications, and improvements will become apparent to the skilled artisan. Such other features, modifications, and improvements are, therefore, considered to be a part of this invention, the scope of which is to be determined by the following claims.

What is claimed is:

1. A method of making a coated article, the method comprising:

forming a layer comprising diamond-like carbon (DLC) on a substrate; and exposing the layer comprising DLC to ultraviolet (UV) radiation so that the layer comprising DLC has a contact angle θ of less than or equal to 20 degrees.

2. The method of claim 1, wherein the layer comprising DLC is formed using an ion beam.

3. The method of claim 1, wherein the layer comprising DLC has a contact angle of less than or equal to 15 degrees.

4. The method of claim 1, wherein the layer comprising DLC has a contact angle of less than or equal to 10 degrees.

5. The method of claim 1, wherein the layer comprising DLC is ion beam deposited in a manner so as to include hydrogen.

6. The method of claim 1, wherein the layer comprising DLC has an average hardness of at least 10 GPa.

7. The method of claim 1, wherein the layer comprising DLC has an average hardness of at least 20 GPa.

8. The method of claim 1, wherein the layer comprising DLC is provided on the substrate, so that a low-E coating is located between the substrate and the layer comprising DLC.

9. The method of claim 8, wherein the low-E coating comprises at least one layer comprising silver.

10. The method of claim 1, wherein the coated article is a window having a visible transmittance of at least 60%.

11. The method of claim 1, wherein the layer comprising DLC includes $sp^3$ carbon-carbon bonds.

* * * * *